(12) United States Patent
Leier et al.

(10) Patent No.: US 11,739,904 B2
(45) Date of Patent: Aug. 29, 2023

(54) LIGHTING APPARATUS FOR A VEHICLE HAVING A PLANAR LIGHT GUIDE AND AN ELONGATE LIGHT GUIDE

(71) Applicant: Hella GmbH & Co. KGaA, Lippstadt (DE)

(72) Inventors: Yves Alexander Leier, Lippstadt (DE); Niko Thomanek, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/733,238

(22) Filed: Apr. 29, 2022

(65) Prior Publication Data

US 2022/0260227 A1 Aug. 18, 2022

Related U.S. Application Data

(63) Continuation of application No. PCT/EP2020/079542, filed on Oct. 21, 2020.

(30) Foreign Application Priority Data

Oct. 30, 2019 (DE) ...................... 10 2019 129 339.1

(51) Int. Cl.
*F21S 43/237* (2018.01)
*F21S 43/239* (2018.01)
*F21S 43/15* (2018.01)

(52) U.S. Cl.
CPC ............. *F21S 43/237* (2018.01); *F21S 43/15* (2018.01); *F21S 43/239* (2018.01)

(58) Field of Classification Search
None
See application file for complete search history.

(56) References Cited

U.S. PATENT DOCUMENTS 10,274,151 B2 * 4/2019 Faffelberger ............ F21S 41/24
2013/0235611 A1 9/2013 Franklin et al.
(Continued)

FOREIGN PATENT DOCUMENTS

DE 102015107067 A 11/2016
DE 102017119475 A1 10/2018
(Continued)

OTHER PUBLICATIONS

International Search Application dated Jan. 26, 2021 in corresponding application PCT/EP2020/079542.

*Primary Examiner* — Robert J May
(74) *Attorney, Agent, or Firm* — Muncy, Geissler, Olds & Lowe, P.C.

(57) ABSTRACT

A lighting apparatus for vehicles, comprising a planar light-guiding element, which has opposing flat sides at which input coupled light is totally internally reflected, which has a first narrow side in a light input coupling region for coupling in the light, which has a second narrow side in a light output coupling region for coupling out the light in a main emission direction of the lighting apparatus, and which has a connecting side connecting the first narrow side and the second narrow side. An elongate light guide follows the contour of the first narrow side of the planar light-guiding element is provided in an arranged fashion with a first end face arranged at one end side and with a second end face, between which a lateral surface of the elongate light guide extends, said lateral surface having output coupling elements for diverting the light coupled into the elongate light guide.

11 Claims, 2 Drawing Sheets

(56) References Cited

U.S. PATENT DOCUMENTS

2014/0247615 A1  9/2014  Fadi et al.
2017/0219178 A1  8/2017  Faffelberger et al.

FOREIGN PATENT DOCUMENTS

| JP | 2006286505 A | 10/2006 |
| JP | 2014235819 A | 12/2014 |

* cited by examiner

LIGHTING APPARATUS FOR A VEHICLE HAVING A PLANAR LIGHT GUIDE AND AN ELONGATE LIGHT GUIDE

This nonprovisional application is a continuation of International Application No. PCT/EP2020/079542, which was filed on Oct. 21, 2020, and which claims priority to German Patent Application No. 10 2019 129 339.1, which was filed in Germany on Oct. 30, 2019, and which are both herein incorporated by reference.

BACKGROUND OF THE INVENTION

Field of the Invention

The present invention relates to a lighting apparatus for vehicles, comprising a planar light-guiding element, which has opposing flat sides at which input coupled light is totally internally reflected, which has a first narrow side in a light input coupling region for coupling in the light, which has a second narrow side in a light output coupling region for coupling out the light in a main emission direction of the lighting apparatus, and which has a connecting side connecting the first narrow side and the second narrow side.

Description of the Background Art

A lighting apparatus for vehicles is known from DE 10 2015 107 067 A1, which is herein incorporated by reference, and which has a planar light-guiding element. The planar light-guiding element enables a narrow or elongated light signature, wherein light is input coupled at a first narrow side of the planar light-guiding element and output coupled at a further second narrow side. Opposing flat sides, on which the coupled light is totally internally reflected, extend between the first and second narrow side. The first narrow side and the second narrow side are connected to one another by a connecting side that has the same width as the first and second narrow side. Light is neither input coupled nor output coupled at the connecting side. The first narrow side is associated with a plurality of light guides, each of which lie like fingers against the first narrow side. The light guides each have a first end face, on which a light source is arranged, and a second end face, which lies directly against the first narrow side of the planar light-guiding element. Advantageously, as a result, the light sources can be arranged on a common support plate that runs parallel to the flat sides.

When a signal light function is generated, it is desirable to reduce the cost as much as possible. As can be seen from FIG. 1, in the case of the rear lighting of a vehicle it is known to arrange a light guide 1' along a first narrow side 2' of a planar light-guiding element 3'. Advantageously, only a single light source 4' is then required. Said light source 4' is arranged in an area of a movable body component 6', for example, a hatch door, said area being close to a housing end edge 5'. An additional lighting apparatus with a planar light-guiding element 8' is attached to a fixed body component 7', wherein this can be arranged relatively close to a housing end edge 9' of body component 7', because input coupled light guide 10' is supplied with light from a side facing away from housing body edge 9'. Light source 4' installed in hatch door 6' must be arranged on the side of light guide 1' facing housing edge 5', because light guide 1' runs at an angle to a longitudinal axis of the vehicle and thus the deflection angle range for light input coupling from housing edge 5' is considerably smaller than if the light were input coupled from the side of light guide 1' facing away from housing edge 5'. If light guide 1' is tilted at 45° to the longitudinal axis of the vehicle, the light coupled into the light guide from housing edge 5' only needs to be diverted by about 225°, whereas it would have to be diverted by 315° from the opposite side. The disadvantage of arranging light source 4' on the side of light guide 1', said side facing housing end edge 5', is that there is a relatively large distance a' between housing end edge 5' and a connecting line 11' of planar light guide 3' 3. It is desirable to keep this distance a' as small as possible so that the signal light function can be radiated as interruption-free as possible from the lighting apparatus installed in hatch door 6' and lighting apparatus 8' installed in the adjacent body component.

SUMMARY OF THE INVENTION

It is therefore an object of the present invention to develop further a lighting apparatus for vehicles such that a light illumination area close to a housing end edge is ensured in a cost-effective manner, so that in particular the distance to a further lighting apparatus, installed in an adjacent body component, is as small as possible.

To achieve said object, the invention is characterized in that an elongate light guide that follows the contour of the first narrow side of the planar light-guiding element is provided in an arranged fashion, with a first end face arranged at the end side and with a second end face, between which a lateral surface of the elongate light guide extends, said lateral surface having output coupling elements for diverting the light coupled into the elongate light guide, so that the light is output coupled from the elongate light guide in the direction of the first narrow side of the planar light-guiding element from a longitudinal section of the lateral surface facing the first narrow side of the planar light-guiding element, and so that the first narrow side and the connecting side of the planar light-guiding element extend in elevated fashion in the direction of a corner region of the planar light-guiding element, in relation to a base plane that is spanned by the main emission direction and the extension direction.

An advantage of the invention is that a distance of an illumination area of the planar light-guiding element to a housing end edge of a body component can be small. A connecting side, which connects a light-input-coupling first narrow side and a light-output-coupling second narrow side of the planar light-guiding element, runs in a substantially curved manner in the direction of a corner region of the planar light-guiding element, in which it converges with the first narrow side. In this way, the corner region is arranged in an elevated position with respect to a plane formed by the second narrow side and the light emission direction of the planar light-guiding element. Due to the elevated arrangement of the corner region and the first end face of the light guide, a main axis of the light source need not run perpendicular to the housing end edge, but at a relatively steep angle thereto. Advantageously, an illumination can take place that is relatively close to the housing end edge. Because the corner region is formed elevated relative to the other part of the planar light-guiding element, the required installation depth can be reduced.

The connecting side can be arranged rotated with respect to an extension line of the connecting side. The rotation of the connecting side about its own extension axis corresponding to a torsion has the effect that the distance of the connecting side to the housing end edge can be made relatively close regardless of the arrangement of the light source.

The first narrow side of the planar light-guiding element can be formed in a curved shape in the direction of the corner region and is formed rotated about an extension line thereof by a rotation angle, so that the light is arranged relatively steeply and at a large angle with respect to the plane spanned by the extension of the second narrow side and the main emission direction. The light source can thus be arranged at least partially substantially on the planar light-guiding element when projected onto the plane formed by the second narrow side and the main emission direction. By twisting the connecting side and preferably the first narrow side of the planar light-guiding element in the direction of the corner region, the light input coupled by the first narrow side can be coupled in substantially in the corner region parallel to the connecting side at the first narrow side and guided further along the connecting side. The light losses are therefore relatively low.

A rotation angle of the connecting side and/or the first narrow side can be in a range between 70° and 90°. Advantageously, the light can be input coupled and guided further in the desired manner in the corner region of the planar light-guiding element.

A main axis of the light source can be arranged in a perpendicular or at a small angle to the perpendicular, wherein the perpendicular runs perpendicular to a base plane of the planar light-guiding element. Advantageously, the light source can be oriented substantially perpendicular to a plane spanned by a main emission direction and an extension direction of the second narrow side of the planar light-guiding element. The light source thus does not increase the required distance of the connecting side of the planar light-guiding element to the housing end edge.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
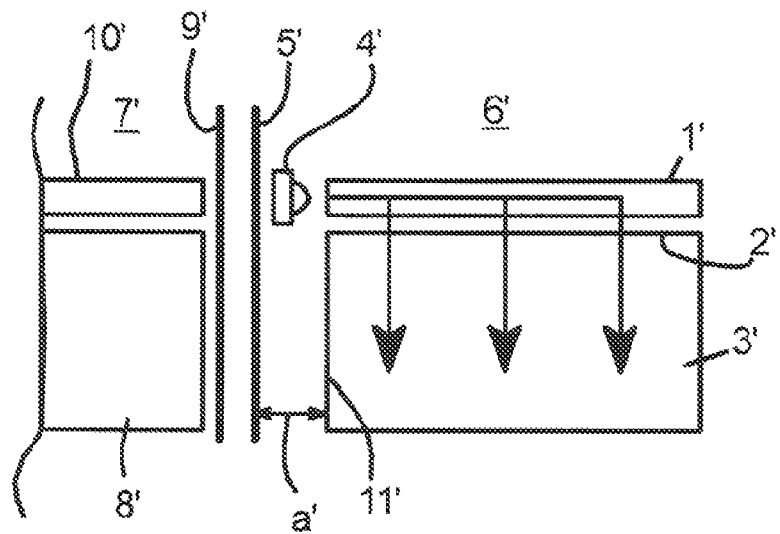
FIG. 1 shows a top view of a conventional lighting apparatus with a flat planar light-guiding element.

A lighting apparatus 1 of the invention is arranged installed in a first body component 2. The first body component 2 can be, for example, a hatch door of a vehicle. An additional lighting apparatus 3 is arranged installed in a second body component 4 which is adjacent to first body component 2 and is stationary in the present exemplary embodiment. The two lighting apparatuses 1, 3 are used to generate the same signal light function, for example, a taillight function.

Due to the structure of the body, there is a gap between a body end edge 5 of first body component 2 and a body end edge 6 of second body component 4. In order to provide a uniform illuminated area, it is desirable that lighting apparatuses 1, 3 run as close as possible to the respective body end edges 5 and 6. Due to lighting apparatus 1 of the invention, a distance 'a' of lighting apparatus 1 from body end edge 5 is relatively small even though a light source 7 is arranged in the vicinity of body end edge 5. Alternatively, the invention can also be used for lighting apparatuses in which at least two different lighting apparatuses are arranged separated from one another by at least one housing part or panel. The invention enables a spaced arrangement of at least two lighting apparatuses with a small distance to one another, said arrangement being effected by a separating part.

Lighting apparatus 1 essentially is formed of a planar light-guiding element 8 as well as an elongate light guide 9, by means of which the light emitted by light source 7 is fed to planar light-guiding element 8.

The planar light-guiding element 8 has opposite flat sides 10, preferably running parallel, on which input-coupled light is totally internally reflected. In a light input-coupling region of planar light-guiding element 8, the same has a first narrow side 11 for coupling in the light. In a light output coupling region, planar light-guiding element 8 has a second narrow side 12 for coupling out the light in the main emission direction H of lighting apparatus 1. First narrow side 11 and second narrow side 12 are connected to one another by a connecting side 13, wherein connecting side 13 runs substantially at the constant distance 'a' from body end edge 5 of first body component 2. A further connecting side 14 is arranged on a side, facing away from body end edge 5, of planar light-guiding element 8.

Light guide 9 is assigned to first narrow side 11 of planar light-guiding element 8 and has a first end face 15 and a second end face 16, which are connected to one another by means of a lateral surface 17. Lateral surface 17 can be formed circular in cross section, for example, so that elongate light guide 9 extends in the shape of a cylinder. Output coupling elements (not shown) are provided on lateral surface 17 and/or within light guide 9 for diverting the light coupled into elongate light guide 9, so that the light emerges from light guide 9 along a longitudinal section of lateral surface 17, said section being associated with first narrow side 11 of planar light-guiding element 8. First end face 15 of light guide 9 is associated with light source 7.

Planar light-guiding element 8 is not formed flat. Planar light-guiding element 8 rises from a plane spanned by an extension line $E_1$ of second narrow side 12 and main emission direction H in the direction of a rear corner region 18 of light-guiding element 8, wherein corner region 18 is arranged on a side facing body end edge 5. Second narrow side 12 of planar light-guiding element 8 extends in a straight line in the present exemplary embodiment, so that the extension line $E_1$ is also formed as a straight line. A base plane B of planar light-guiding element 8 thus extends in an x-y plane. The x-direction corresponds to the main emission direction H. Second narrow side 12 of planar light-guiding element 8 is located on a front side of lighting apparatus 1.

Both connecting side 13 and first narrow side 11 of planar light-guiding element 8 extend in a curved manner out of the base plane B in the direction of corner region 18, so that light source 7 is arranged with orientation of a main axis A thereof perpendicular to the base plane B or oriented in an angle range of 75° to 105°. The main axis A of light source 7 thus runs in a perpendicular or in a small angle range of ±15° to the perpendicular, wherein the perpendicular is perpendicular to the base plane B.

The light guide 9 may be arranged following the contour of first narrow side 11 of planar light-guiding element 8, and first end face 15 is arranged substantially perpendicular to the main axis A of light source 7. The main axis A coincides with the main emission direction H of light source 7, which is preferably formed as an LED light source. Due to light source 7 being oriented substantially perpendicular to the base plane B, the same (not as in the prior art) is arranged next to planar light-guiding element 8 in a projection onto the base plane B, but intersects the same or is arranged substantially within planar light-guiding element 8. A distance 'a' between lighting apparatus 1 and body end edge 5 can thus be selected to be relatively small. When lighting apparatus 1 and the additional lighting apparatus 3 are operated together, the result is an almost uninterrupted homogeneous illumination area formed by second narrow side 12 of lighting apparatus 1 and a narrow surface 19 of the additional lighting apparatus 3.

Figure 2:
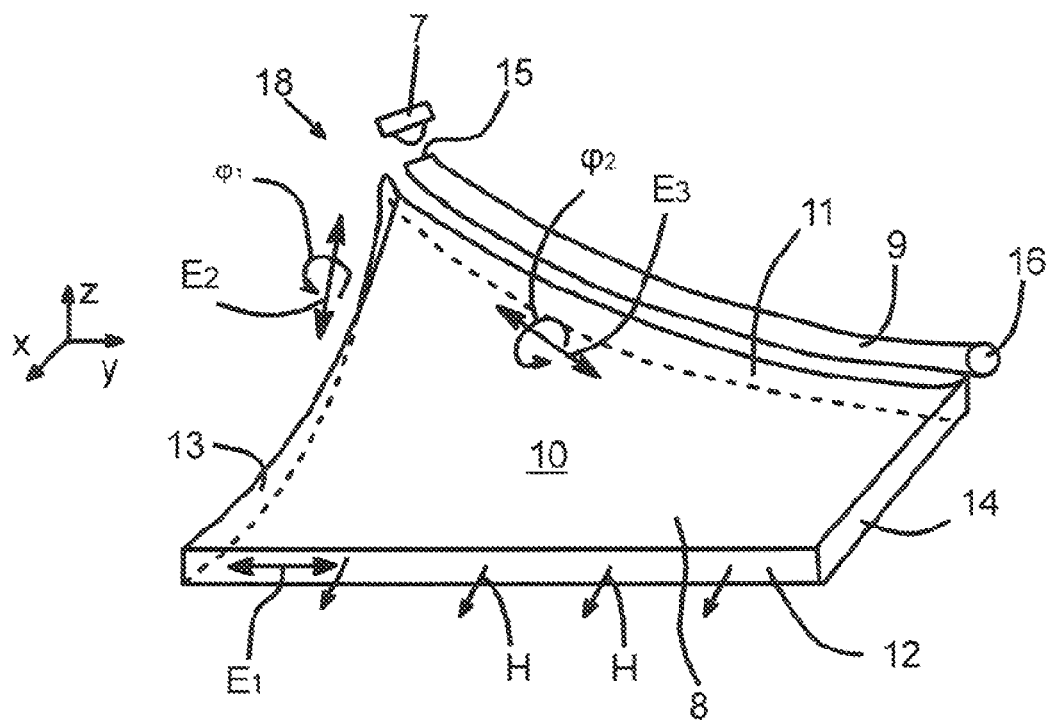
FIG. 2 shows a perspective representation of a lighting apparatus of the invention.

Preferably, connecting side 13 or first narrow side 11 is formed with respect to an extension line $E_2$ or $E_3$ of the same, extending in the direction of corner region 18 in a rotated manner by a rotation angle $\varphi_1$ or $\varphi_2$. As is evident from FIG. 2, connecting side 13 is rotated in the direction of corner region 18 about the extension line $E_2$ to the right by the rotation angle $\varphi 1$. First narrow side 11 is rotated in the direction of corner region 18 around the extension line $E_3$ to the left by the rotation angle $\varphi_2$. The rotation angle $\varphi_1$ or $\varphi_2$ can be in the range between 70° and 90°. Advantageously, the light output can be improved without light being able to escape laterally, therefore, at connecting side 13, from planar light-guiding element 8.

First narrow side 11 and connecting side 13 run continuously in a curved manner towards corner region 18. The extension lines $E_2$, $E_3$ are also formed in a curved manner.

The curved course of first narrow side 11 runs in a three-dimensional space. A first curved component is formed, which runs in the y-z plane, therefore, in a transverse plane to the main emission direction H. An additional curved component runs in the x-y direction, therefore, in the base plane B. In a horizontal arrangement of the base plane B, first narrow side 11 thus runs upward and backward in a curved manner in the direction of corner region 18.

Connecting side 13 runs in a curved manner solely in the x-z plane, therefore, in a plane perpendicular to the base plane B and parallel to the main emission direction H.

Preferably, connecting side 13 follows the contour to body end edge 5 of first body component 2. If necessary, it can also run in a curved manner in the x-y plane.

Figure 3:
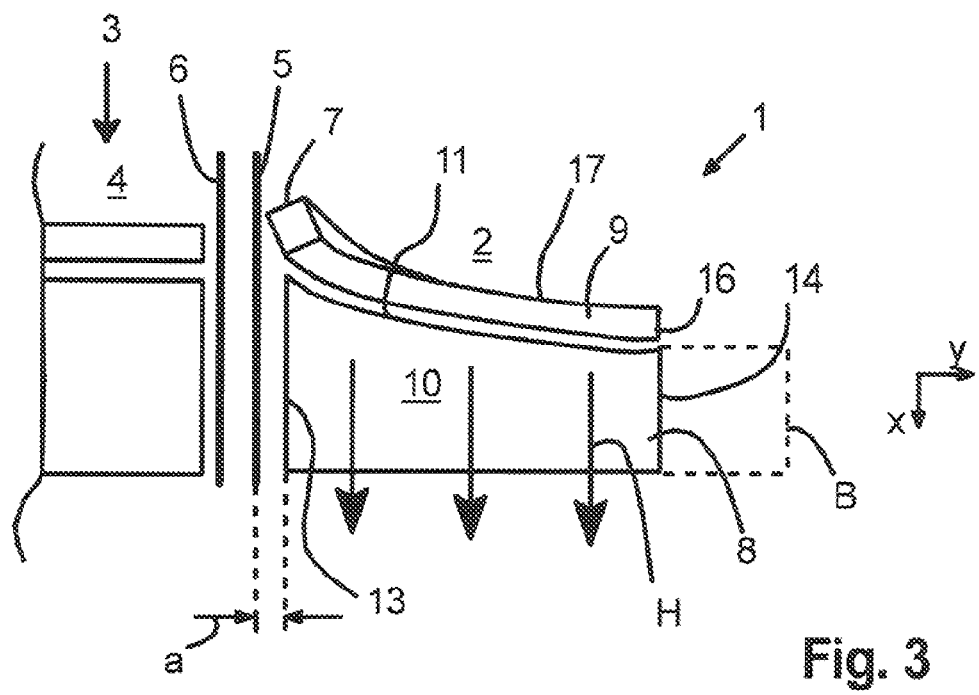
FIG. 3 shows a top view of the lighting apparatus and an adjacent further lighting apparatus installed in another body component.
Figure 4:
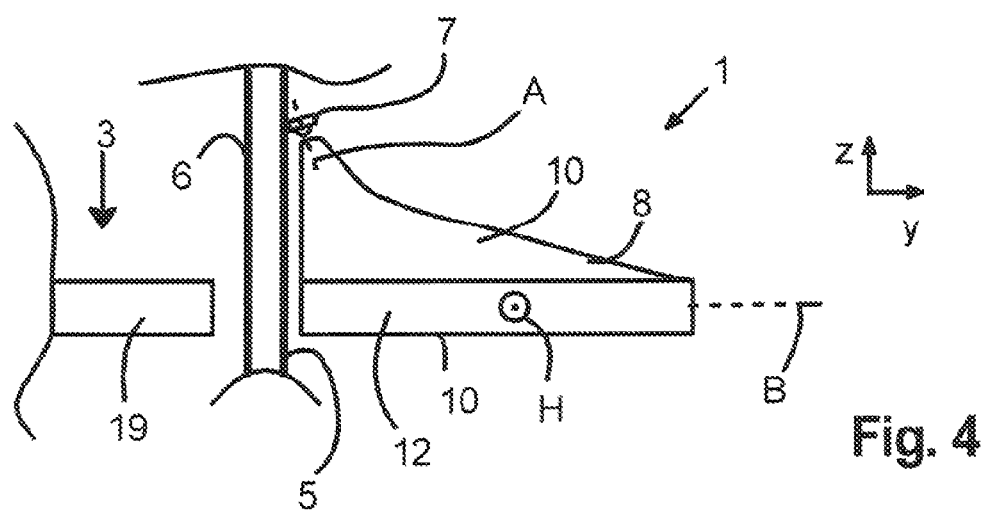
FIG. 4 shows a front view of the lighting apparatus shown in FIG. 3.

It can be seen from FIG. 3 that light source 7 is arranged in the extension of connecting side 13. The distance 'a' of lighting apparatus 1 to body end edge 5 is thus essentially determined by housing parts (not shown) of lighting apparatus 1.

Further, second narrow side 12 can also have non-straight sections, for example, at least partially curved and/or multiple straight sections.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting apparatus for a vehicle, the lighting apparatus comprising:
    a planar light-guiding element that has opposing flat sides at which input coupled light is totally internally reflected and that has a first narrow side in a light input coupling region for coupling in the light and that has a second narrow side in a light output coupling region for coupling out the light in a main emission direction of the lighting apparatus, and that has a connecting side connecting the first narrow side and the second narrow side; and
    an elongate light guide that follows a contour of the first narrow side of the planar light-guiding element and is provided in an arranged fashion, with a first end face and a second end face, between which a lateral surface of the elongate light guide extends, the lateral surface having output coupling elements for diverting the light coupled into the elongate light guide so that the light is output coupled from the elongate light guide in a direction of the first narrow side of the planar light-guiding element from a longitudinal section of the lateral surface facing the first narrow side of the planar light guiding element,
    wherein each of the first narrow side and the connecting side of the planar light guiding element rise from a base plane, that is spanned by an extension direction of the second narrow side and the main emission direction, in a direction of a corner region of the planar light-guiding element, and
    wherein the first narrow side runs in the direction of the corner region with respect to an extension line of the first narrow side rotated by a rotation angle and/or the connecting side runs in the direction of the corner region with respect to an extension line of the connecting side rotated by a rotation angle.

2. The lighting apparatus according to claim 1, wherein the rotation angle of the first narrow side or the rotation angle of the connecting side is in a range from 70° to 90°.

3. The lighting apparatus according to claim 1, wherein the first narrow side and the connecting side run continuously into the corner region.

4. The lighting apparatus according to claim 1, wherein the first end face of the elongate light guide is associated with a light source.

5. The lighting apparatus according to claim 4, wherein the light source intersects an imaginary extension of the connecting side.

6. The lighting apparatus according to claim 4, wherein a main axis of the light source runs in a perpendicular or at a small angle to the perpendicular, wherein the perpendicular is arranged perpendicular to the base plane of the planar light-guiding element.

7. A lighting apparatus for a vehicle, the lighting apparatus comprising:
    a planar light-guiding element that has opposing flat sides at which input coupled light is totally internally reflected and that has a first narrow side in a light input coupling region for coupling in the light and that has a second narrow side in a light output coupling region for coupling out the light in a main emission direction of the lighting apparatus, and that has a connecting side connecting the first narrow side and the second narrow side; and an elongate light guide that follows a contour of the first narrow side of the planar light-guiding element and is provided in an arranged fashion, with a first end face and a second end face, between which a lateral surface of the elongate light guide extends, the lateral surface having output coupling elements for diverting the light coupled into the elongate light guide so that the light is output coupled from the elongate light guide in a direction of the first narrow side of the planar light-guiding element from a longitudinal section of the lateral surface facing the first narrow side of the planar light guiding element, wherein each of the first narrow side and the connecting side of the planar light guiding element rise from a base plane, that is spanned by an extension direction of the second narrow side and the main emission direction, in a direction of a corner region of the planar light-guiding element, and wherein the first narrow side runs in a curved manner in a three-dimensional space, wherein a portion of the first narrow side extends in a plane substantially perpendicular to the main emission direction and another portion of the first narrow side extends in the base plane.

8. The lighting apparatus according to claim 7, wherein the connecting side of the planar light-guiding element runs in a curved manner in a two-dimensional space, wherein a curved shape runs in a plane perpendicular to the base plane and parallel to the main emission direction.

9. A lighting apparatus for a vehicle, the lighting apparatus comprising:

a planar light-guiding element that has opposing flat sides at which input coupled light is totally internally reflected and that has a first narrow side in a light input coupling region for coupling in the light and that has a second narrow side in a light output coupling region for coupling out the light in a main emission direction of the lighting apparatus, and that has a connecting side connecting the first narrow side and the second narrow side; and an elongate light guide that follows a contour of the first narrow side of the planar light-guiding element and is provided in an arranged fashion, with a first end face and a second end face, between which a lateral surface of the elongate light guide extends, the lateral surface having output coupling elements for diverting the light coupled into the elongate light guide so that the light is output coupled from the elongate light guide in a direction of the first narrow side of the planar light-guiding element from a longitudinal section of the lateral surface facing the first narrow side of the planar light guiding element, wherein each of the first narrow side and the connecting side of the planar light guiding element rise from a base plane, that is spanned by an extension direction of the second narrow side and the main emission direction, in a direction of a corner region of the planar light-guiding element, and wherein the lighting apparatus is installed in a first body component at a distance from a body end edge thereof, the distance being determined from the connecting side of the planar light-guiding element to the body end edge of the first body component.

10. The lighting apparatus according to claim 9, wherein a body end edge of a second body component, movable relative to the first body component, is provided parallel to the body end edge of the first body component, wherein an additional lighting apparatus is installed in the second body component.

11. The lighting apparatus according to claim 10, wherein the lighting apparatus installed in the first body component and the additional lighting apparatus installed in the second body component are controlled to generate a same signal light function.

\* \* \* \* \*